3,247,280
**RESINOUS REACTION PRODUCT OF AN AMINO-
ORGANOSILICON COMPOUND AND A POLY-
EPOXIDE**
Bernard Kanner, Tonawanda, N.Y., assignor to Union
   Carbide Corporation, a corporation of New York
   No Drawing. Filed Dec. 6, 1961, Ser. No. 157,569
           8 Claims. (Cl. 260—824)

This application is a continuation-in-part application of application Serial No. 691,164, filed October 21, 1957, and now abandoned.

This invention relates to curable organofunctional-silicon-epoxy compositions and resinous products made therefrom. More particularly, this invention is directed to novel, resinous compositions produced from epoxy compounds and silicon compounds containing at least one amino group attached to silicon through carbon.

I have found that a new class of silicon-containing resinous products can be made by reacting amino-organo-silicon compounds with epoxy compounds. As used herein, the term "epoxy" in designating a compound or group means a compound containing, or the group composed of oxirane oxygen attached to vicinal carbon atoms, i.e.,

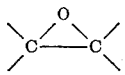

My resinous products range from tacky adhesives and soft elastomeric gums to very hard, clear solids and, in accordance with the teachings of this invention, any resinous product falling within this range can be obtained, as desired. They are particularly resistant to the thermal decomposition normally exhibited by organic polymers, e.g., as evidenced by charring or discoloration, and do not undergo the extreme weight loss at high temperatures normally shown by silicone polymers. My curable compositions are used in the manufacture of adhesives, potting and molding formulations, and as coating and laminating compositions. These compositions, for example, when applied as extremely thin coatings on metal surfaces render such surfaces outstandingly resistant to severely corrosive environments. A particular advantage of those of my compositions containing aminosilicon compounds is the capability of curing to protective coatings at ambient temperatures. The term "amino-organosilicon compound," as used herein, is employed for brevity to designate amino-organosilicon compounds, in general, wherein the amino moiety is attached to carbon and those specifically defined hereinafter. In casting applications my compositions are particularly outstanding in that the excessively high "exotherms," i.e., exothermic heat, during curing normally present when epoxy compounds are cured by organic amines are completely absent when my compositions are cured. This property is especially important when large castings are being made or heat sensitive parts are being encapsulated as in the potting of electronic components. My resinous compositions possess many advantageous electrical properties, such as improved power factor, dielectric constant and loss factor as measured at frequencies of 60 to $10^6$ c.p.s.

In accordance with my invention a polyepoxide and an amino-organosilicon compound are mixed to form curable compositions which are then cured to form my resinous products. These products are more particularly described as being a polymer comprising the reaction product of (1) an amino-organosilicon compound having at least one silicon atom that is:

A. bonded to from one to three oxygen atoms, each oxygen atom being bonded to a member selected from the group consisting of silicon, hydrogen and the hydrocarbyl groups;

B. bonded to from one to three amino-organo radicals selected from the group consisting of:

(I) Aminoaralkyl groups represented by the formula:

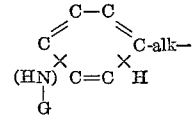

wherein alk is an aliphatic group containing at least two carbon atoms in the carbon chain linking each

group and said silicon atom, G is a member selected from the group consisting of the hydrocarbyl groups and the hydrogen atom, there are from one to three of the

groups and from 2 to 4 of the H— atoms bonded to carbon atoms of the

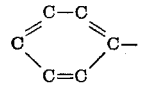

ring and the total number of said

groups and H— atoms that are bonded to said ring being five;

(II) Aminoalkylaminoalkyl groups represented by the formula:

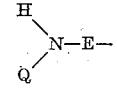

wherein E is an alkylene group having the formula $C_nH_{2n}$ where $n$ has a value from 3 to 9, Q is an aminoalkyl group having the formula $$G-\overset{H}{\underset{|}{N}}(CH_2)_m-$$

where G has the above-defined meaning and $m$ has a value from 1 to 4 and the

group is at least three carbon atoms removed from said silicon atom;

(III) Aminotriazinylaminoalkyl groups represented by the formula:

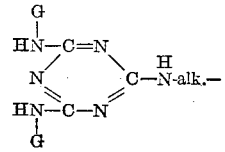

wherein alk. is an alkylene group having from 3 to 9 carbon atoms and G is a member selected from the group consisting of the hydrocarbyl groups and the hydrogen atom and the nitrogen that is linked to the group denoted by alk. is at least three carbon atoms removed from the silicon atom; and (IV) Groups represented by the formula:

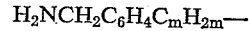

wherein $m$ has a value from 0 to 20 inclusive; and

C. bonded by each of any remaining valences to a member selected from the group consisting of hydrogen and the hydrocarbon groups and (2) a polyepoxide containing at least two epoxy groups, each epoxy group being composed of an oxirane oxygen atom attached to vicinal carbon atoms.

The relative portions of amino-organosilicon compound and polyepoxide employed can be varied over a wide range. Stoichiometric amounts of these compounds are desirable, i.e., amounts of amino-organosilicon compound containing one active hydrogen (hydrogen attached to nitrogen of an amine group) for each epoxy group contained by the amounts of polyepoxide. However, relative amounts of these compounds containing active hydrogen to epoxy ratios of about 0.2 to 2.0 are employed to produce our resins. Relative amounts containing active hydrogen to epoxy ratios outside of this range can also be used for special applications. The preferred ratio is about one amino hydrogen equivalent per epoxy equivalent. By the terms "epoxy equivalent" and "amino hydrogen equivalent", as used herein, is meant the number of moles of, respectively, epoxy groups, amino hydrogens, and carboxylic hydrogens contained by given amounts of, respectively, epoxy compound and aminosilicon compound. For example, one mole of diglycidyl ether contains 2 epoxy equivalents and one mole of aminomethylphenyltriethoxysilane contains 2 amino hydrogen equivalents.

Those curable compositions containing aminoorganosilicon compounds and epoxides are readily cured by allowing them to stand at ambient temperature. Such compositions can be cured in four or more hours at room temperature (about 25° C.). Higher temperatures are employed to form fully cured resins in shorter periods of time. For example, temperatures as high as 150° C. to 200° C. can be employed to cure my curable compositions. The curing temperature and time can be varied at will to form resinous products which possess the physical properties particularly desired. For example, it has been found that when my curable compositions are cured at high temperatures, resins having increased heat distortion temperatures are obtained.

The amino-organosilicon compounds which are employed in my invention contain one or more silicon atoms each of which is bonded to one to three oxygen atoms which in turn are bonded to no other groups than silicon, hydrogen, and hydrocarbyl. These compounds are further characterized by at least one amino group attached to silicon through carbon and selected from the class of aminoalkyl-substituted aminoalkyl, aminomethylaryl, aminomethylarylalkyl, aminotriazinylaminoalkyl and aminoarylalkyl groups wherein the amino moiety is connected to silicon through not less than three carbon atoms and contains at least one nitrogen bonded amino hydrogen atom. The remaining unfilled valences of silicon are satisfied by no other groups than those from the class of hydrogen and hydrocarbyl. By the term "hydrocarbyl," as used herein, is meant the monovalent group composed of only carbon and hydrogen, for example, methyl, phenyl, vinyl and the like. Thus, the amino-organosilicon compounds employed in my invention include the aminosilanes and aminoorganosiloxanes.

One type of amino-organosilicon compound which is particularly useful in my compositions are those aminotriazinylaminoalkyl compounds represented by the formula:

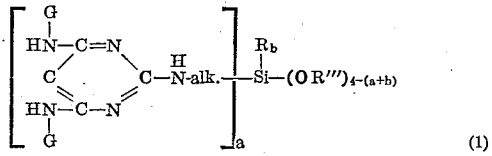

(1)

where G is hydrogen, an alkyl group or an aryl group, R is hydrogen or a hydrocarbyl group, R''' is hydrogen or a monovalent hydrocarbon group, $a$ is an integer having a value from 1 to 3 inclusive, $b$ is an integer having a value from 0 to 2 inclusive, $a+b$ has an integral value from 1 to 3 inclusive, and alk is an alkylene group, $C_nH_{2n}$, having from 3 to 9 carbon atoms. Illustrative of these compounds are the amino-triazinylaminoalkylalkoxysilanes including 3,5-diaminotriazinylaminopropyltriethoxysilane, 3,5-diaminotriazinylaminobutylphenyldiethoxysilane, 3,5-diaminotriazinylaminobutylmethyldiethoxysilane, 3,5-diaminotriazinylaminopropylphenyldiethoxysilane, 3,5 - dibutylaminotriazinylaminopropyltriethoxysilane, 3-propylamino - 5-phenylaminotriazinylaminobutylmethyldiethoxysilane, 3,5-diphenylaminotriazinylaminopropyltriethoxysilane, and the like. The diaminotriazinylaminoalkylpolysiloxanes made from the above-described silanes are also useful in my compositions and are represented by the formula:

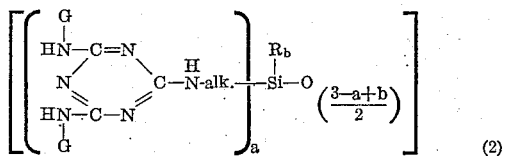

(2)

where G, alk., $a$, R, and $b$ are defined above for Formula 1.

Copolymers containing combined diaminotriazinylaminoalkylsiloxane units and hydrocarbylsiloxane units, both types described above, are useful in my compositions. These silanes, siloxanes and copolymers are disclosed in United States Patent No. 2,949,434. Processes for producing such compounds are also disclosed in said patent.

The aminophenylalkylsilanes represented by the following formula are also particularly useful in my compositions:

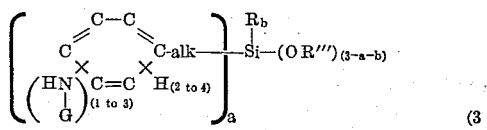

(3)

wherein $a$, alk, R, R''', G and $b$ are defined above for Formula 1. Such silanes include beta(meta-aminophenyl)ethyltriethoxysilane, beta(3,5-diaminophenyl)ethylmethyldiethoxysilane, gamma(3,5-dimethylaminophenyl)propylphenyldiethoxysilane, and the like. The siloxanes made from these silanes also can be used. Copolymers containing combined aminophenylalkylsiloxane units, such as those made from the above-described aminophenylalkylsilanes, and hydrocarbysiloxane units similarly can be employed in my compositions. These silanes, siloxanes and copolymers are all described in copending application 655,506, filed April 29, 1957, now abandoned.

Aminoalkylaminoalkylsilanes and siloxanes made therefrom are also used in making my compositions. These silanes are represented by the formula:

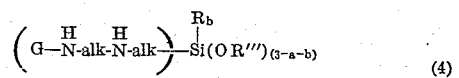

(4)

where G, alk, $a$, R, $b$ and R''' are defined above for Formula 1. Such silanes include N-(beta-aminoethyl)-gamma-aminopropyltriethoxy-silane, N-(gamma - aminopropyl) - delta - aminobutyltriethoxysilane, N - [gamma-(phenylamino) propyl] - gamma - aminopropylmethyldiethoxysilane, N - [gamma - (ethyl-amino)propyl] - delta-aminobutylmethyldiethoxysilane, N - (delta-aminobutyl)-delta-aminobutyltriethoxysilane and the like. Copolymers containing combined aminoalkylaminoalkylsiloxane units, such as those made from the above-described aminoalkyl-aminoalkylsilanes, and hydrocarbylsiloxane units can be used in my compositions. These silanes, siloxanes and copolymers are all described in U.S. application, Serial No. 615,480, filed October 12, 1956, now abandoned.

Still another type of amino-organosilicon compounds which are useful in my compositions are the aminomethylarylsilanes and aminomethylarylalkylsilanes represented by the formula:

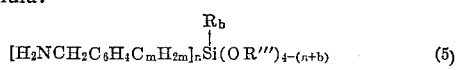

wherein $m$ has a value from 0 to 20 inclusive (preferably from 0 to 5 inclusive), $n$ has a value from 1 to 3 inclusive, $(n+b)$ has a value from 1 to 3 inclusive and R, R''' and $b$ have the meanings defined above for Formula 1. Such silanes include aminomethylphenyltriethoxysilane, beta-(aminomethylphenyl)-ethyltriethoxysilane and gamma-(aminomethylphenyl)propyldimethylpropoxysilane. The corresponding siloxanes can also be used. Such siloxanes contain groups having the formula:

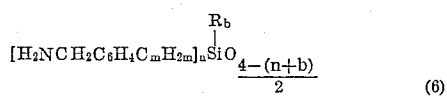

wherein $m$, $n$, $(n+b)$, R, R''' and $b$ have the meanings defined above for Formula 5. Such siloxanes can contain hydrocarbylsiloxane groups (e.g., dimethylsiloxane groups). These silanes and siloxanes and a process for their production are described in U.S. patent application Serial No. 157,590, filed December 6, 1961, now U.S. Patent No. 3,171,851.

Any amino-organosilicon compounds of the type described above whether silanes or siloxanes, cyclics, oils, gums, resins or otherwise can be used in my compositions. Mixtures of the different amino-organosilicon compounds and other hydrocarbylsilicon compounds, such as, the hydrocarbylsilanes and hydrocarbylsiloxanes, e.g., dimethylsilane, phenylsilane, triethylsilane, the dimethylsiloxane oils, the phenylmethylsiloxane oils, the methylsiloxane resins and the like can also be employed.

The hydrocarbylsilicon compounds which can be used in my compositions, including the hydrocarbylsilanes and the hydrocarbylsiloxanes, are well known to those skilled in the art. These compounds can be represented by the formula:

$$[R_c—Si—X_{4-c}] \quad (7)$$

wherein R and $c$ have been previously defined and X is hydroxy, hydrocarbyloxy, preferably alkoxy, or $O_{1/2}$. Preferred amongst these compounds are those containing one or more silicon bonded alkoxy groups. Such compounds include methyltriethoxysilane, dimethyldiethoxysilane, trimethylethoxysilane, diphenyldiethoxysilane, beta-phenylethyltripropoxysilane, octamethylcyclotetrasiloxane, methylsiloxane resins and beta-phenylethyl(methyl)-siloxane oils. Hydrocarbylsiloxane groups represented by Formula 7 can be present in any of the above-described amino-organosiloxanes. The preparation of these compounds are also well known to those skilled in the art and reference is herein made to the numerous United States patents and scientific textbooks and journal articles relating to silicon compounds and their preparation.

The epoxy compounds or polyepoxides which are used in our compositions are organic compounds containing at least two epoxy groups, i.e., at least two pairs of vicinal carbon atoms to each pair of which oxirane oxygen is attached,

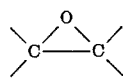

to the molecule. These compounds, for the most part, are composed of carbon, hydrogen and oxygen but also can contain such other atoms as nitrogen, sulfur, halogen, silicon, phosphorous and the like. They are of open chain, branched chain, cyclic, or heterocyclic structure or combinations of such structures and contain single, double or triple bonds, or combinations thereof, connecting the various atoms constituting the polyepoxide molecule. They include compounds which are liquids or solids at ordinary temperatures. Typical polyepoxides are represented by the formula:

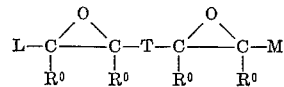

where $R^0$ represents a monovalent hydrocarbon group or hydrogen and need not be the same throughout the same molecule, each of the groups L and M can represent hydrogen or a monovalent group composed of a single carbon atom or a group of carbon atoms interconnected by single or multiple bonds and to which such groups as hydrogen, alkyl, hydroxyl, alkoxy, cyano, cyclic hydrocarbon groups and the like or combinations thereof can be attached. T represents a divalent group which can be composed of a single carbon atom or a group of carbon atoms interconnected by single or multiple bonds and to which such groups as hydrogen, alkyl, hydroxyl, alkoxy, cyclic hydrocarbon groups and the like or combinations thereof can be attached. As groups of carbon atoms, L, M and/or T can contain open chain, e.g., aliphatic or cyclic, e.g., cycloaliphatic or aromatic and heterocyclic groups or combinations thereof. L, M, and/or T can also contain one or more oxirane oxygen atoms attached to vicinal carbon atoms. L, M and/or T can represent alkoxyalkyl groups or groups of carbon atoms interconnected by ether linkages,

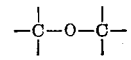

amino linkages,

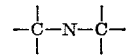

thio linkages

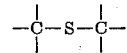

and the like. L and T, M and T or L, M and T taken together with the vicinal carbon atoms shown can represent a cyclic group such as a cyclohexane ring or a cyclopentane ring, substituted or unsubstituted with other groups, e.g., alkyl, aryl substituents and the like. The presence of other groups not otherwise specifically mentioned herein is by no means harmful and, in developing special properties in coatings or films formed from my compositions containing such epoxy compounds. For example, L, M, and/or T can contain one or more olefinic double bonds or acetylenic bonds. The polyepoxides preferably employed in our compositions are selected from the class of diepoxides and triepoxides or mixtures thereof.

Representative of the epoxy compounds defined above are the aliphatic, cycloaliphatic, aliphatic-substituted aromatic and cycloaliphatic-substituted aromatic polyepoxides, such as butadiene dioxide, vinylcyclohexene dioxide, dicyclopentadiene dioxide, diglycidyl ether, 1,2,3-tri(1,2-epoxypropoxy)propane (the triglycidyl ether of glycerine), 3,4-epoxycyclohexylmethyl, 3,4-epoxycyclohexanecarboxylate, 1,6-hexanediol bis(3,4-epoxycyclohexanecarboxylate), 1,1,1-trimethylolpropane tris(3,4-epoxycyclohexanecarboxylate), bis(3,4-epoxy-6-methylcyclohexylmethyl) maleate, bis(2,3-epoxycyclopentyl)ether, divinylbenzene dioxide, and the polyglycidyl polyethers of polyhydric phenols, as for example, the diglycidyl ethers of 4,4'-dihydroxydiphenyl-2,2-propane, 4,4'-dihydroxydiphenylmethane, and the like and the higher polymers thereof as represented by the formula:

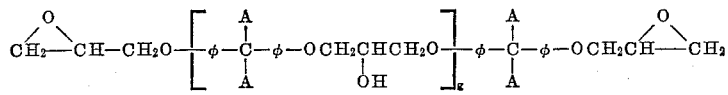

where A is hydrogen or alkyl, φ is phenylene, and g is a number representing the average chain length of the polymer. The polyglycidyl polyethers obtained in practice are complex mixtures of polymers having various molecular weights and various numbers of epoxy groups to the molecule. For example, mixtures of monoepoxide polymers, diepoxide polymers, and polymers of higher epoxy content are obtained. Such mixtures can be characterized by the average number of epoxy groups per molecule, e.g., polyglycidyl polyethers having 1.5 epoxy groups to the molecule. The polyglycidyl polyethers are best characterized by their epoxy equivalency, i.e., the grams of polyglycidyl polyether which contain one gram-mole of epoxy group, and their melting points or melting point ranges such as are determined by Durran's Mercury Method, or their viscosities. The polyhydric phenols, 4,4'-dihydroxydiphenyl-2,2-propane and 4,4'-dihydroxydiphenyl methane are hereinafter referred to as bisphenol A and bisphenol F, respectively.

A large number of epoxy compounds are commercially available. Nevertheless, they also can be made by several methods known in the art. One versatile method involves the epoxidation of organic compounds containing olefinic unsaturation employing as epoxidizing agent any one of a variety of peroxides such as peracetic acid, performic acid, perbenzoic acid, acetaldehyde monoperacetate and the like. For example, vincylclohexene is epoxidized by peracetic acid to vinylcyclohexene dioxide. Epoxidations of this kind are amply described in the literature and reference is made to United States Patents 2,716,123, 2,745,847, 2,750,395 and 2,785,185 and to Chemical Reviews, volume 45, Number 1, August 1949, pages 1 through 68. Epoxy compounds can be also prepared by the reaction of halohydrins, e.g., epichlorhydrin, with monohydric or polyhydric compounds, e.g., phenols and polyhydric phenols. Such reactions are carried out in accordance with methods well known in the art and generally involve the reaction of halohydrin and hydric compound in the presence of sufficient caustic alkali or other strong alkali, to combine with the halogen of the halohydrin. These methods are amply described in the literature, for example, in United States Patents 2,506,486, 2,582,985, 2,592,560 and 2,615,007.

Resinous products can be obtained having physical properties ranging from those of soft semi-solids to those of hard solids, as desired. Products having maximum physical strength enabling their use as potting and casting materials are obtained from compositions which contain amino-organosilicon compounds having at least two amino groups per molecule and having a ratio of amino groups to silicon approximately equal to one. As this ratio decreases or if there is only one amino group per molecule, the resinous products become progressively softer and as the ratio approaches zero the resinous products are soft semi-solids which are useful as adhesives. I prefer to employ amino-organosilicon compounds which have not less than two amino groups per molecule.

The following examples are presented.

In these examples ASTM heat distortion tests (ASTM HDT) are performed as follows:

Test bars were prepared as follows: The amino-organosilicone and epoxy compound were well mixed and then centrifuged to remove gas bubbles. The fluid mixtures were poured into metal molds which were approximately 0.75 inch by 0.75 inch by 6 inches. The samples were cured in an oven for a specified period of time. The bars were then machined to 0.5 inch by 0.5 inch by 5 inches ±0.01 inch.

Heat distortion temperatures were determined by the ASTM method D-648, using a Tinius-Olsen heat distortion testing machine. The procedure consists of determining the temperature at which the 0.15 inch by 0.5 inch bar supported at 4-inch centers distorts 0.010 inch under a load of 5½ lb. applied at the center of the bar. Under these conditions a fiber stress force of 264 p.s.i. is applied to the bar. The specimens are immersed in a silicone oil bath, the temperature of which is automatically raised 2° C. per minute.

*Example 1*

The diglycidyl ether of bisphenol A having the following structural formula:

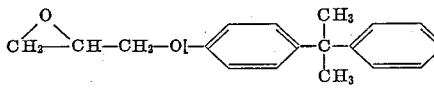 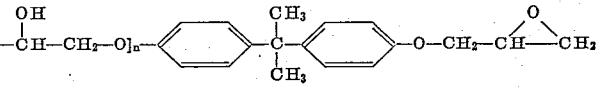

where n is an integer having an average value of 0.1 to 0.2, above, was mixed with beta-meta-aminophenylethylmethylsiloxane cyclic trimer and tetramer, in the proportions of 16 grams of the diglycidyl ether to 8 grams of the aminosilicone. The proportions shown above correspond to a ratio of epoxide equivalent to amino hydrogen equivalent of one to one. The composition was well mixed and then centrifuged to remove bubbles. The composition was then cast into molds at room temperature. The molds were held at a temperature of 110° C. for a period of 1.5 hours. The molded composition was removed from the mold after cooling to room temperature. The cured composition lost 1.8 weight-percent after 10 days at 200° C. in a forced draft oven. The ASTM HDT (264 p.s.i.) was 65° C.

*Example 2*

The diglycidyl ether of bisphenol A having the same structural formula and epoxy equivalent as shown in Example 1 above, was mixed with a 2000 molecular weight dimethylsilicone oil containing 80.8 weight percent of beta-meta-aminophenylethylmethylsiloxane units, in the proportions of 15 grams of the glycidyl ether to 7.5 grams of the aminosilicone. The proportions shown above correspond to a ratio of epoxide equivalent to amino hydrogen equivalent of one to one. The composition was well mixed and then centrifuged to remove bubbles. The composition was then cast into molds at room temperature. The molds were held at a temperature of 110° C. for a period of 1.5 hours. The molded composition was removed from the mold after cooling to room temperature. The cured composition lost 1.2 weight-percent after 10 days at 200° C. in a forced draft oven. The ASTM HDT (264 p.s.i.) was 89° C.

*Example 3*

The diglycidyl ether of bisphenol A having the same structural formula and epoxy equivalent as shown previously in Example 1 was mixed with a 1000 molecular weight dimethylsilicone oil containing 18 weight percent of N-3,5-diaminotriazinyl-delta-aminobutylmethylsiloxane units. The composition was well mixed and poured into a watch glass. The watch glass was held at 150° C. for a period of several hours. Upon cooling to room temperature the composition was observed to be a clear, hard solid.

*Example 4*

The diglycidyl ether of bisphenol A having the same structural formula and epoxy equivalent as previously described in Example 1 was mixed with N-gamma-aminopropyl-delta-aminobutylmethylsiloxane cyclic trimer and tetramer, in the proportions of 16 grams of the glycidyl ether to 7 grams of the aminosilicone. The proportions shown above correspond to a ratio of epoxide equivalent to amino hydrogen equivalent of one to one. The composition was well mixed and centrifuged to remove bubbles. The composition was then cast into molds at room temperature. The molds were held at a temperature of 110° C. for a period of 1.5 hours. The molded composition was removed from the mold after cooling to room temperature. The cured composition lost 3 weight-percent after 10 days at 200° C. in a forced draft oven.

Example 5

Two resins were prepared from the aminosilicon compounds listed below and the diglycidyl ether of bisphenol A having an epoxy equivalency of about 192. Each resin was prepared from a mixture of the amounts of aminosilicon compound and epoxy compound which provided one amino hydrogen of the aminosilicon compound for each epoxy group of the epoxy compound. The mixtures were cured at 100–150° C. for 1–4 hours. After curing, the resins obtained were subjected to the weight loss test which entailed weighing the resins prior to heating, heating for 10 days at 200° C. and weighing them after heating. The percent weight loss is based on the initial weight. Table I summarizes these experiments.

TABLE I

| Aminosilicon Compound | Number of Amino Groups Per Molecule of Aminosilicon Compound | Percent Weight at 200° C. in 10 days |
| --- | --- | --- |
| 650-M.W. meta-aminophenylethyl methyl silicone oil [1] | 3 to 4 | 1.8 |
| 2,000-M.W. meta-aminophenylethyl methyl silicone oil [1] | 9 | 1.2 |

[1] Prepared by equilibrating the corresponding aminosilicon cyclic tetramer with the amounts of $Me_3SiO(Me_2SiO)_3SiMe_3$ and $(Me_2SiO)_4$ to form the listed molecular weight oil in the presence of an equilibration catalyst, e.g. potassium silanolate. The generic formula of these oils is $Me_3SiO(Me_2SiO)_x(H_2NC_6H_4CH_2CH_2SiMeO)_ySiMe_3$.

Example 6

When one mole of the epoxide depicted in Example 1 and one mole of $H_2NCH_2C_6H_4CH_2CH_2Si(OC_2H_5)_3$ are mixed and heated at 110° C. for 2 hours there is produced a resinous composition of this invention.

What is claimed is:
1. A polymer comprising the reaction product of (1) an amino-organosilicon compound having at least one silicon atom that is:
   A. bonded to from one to three oxygen atoms, each oxygen atom being bonded to a member selected from the group consisting of silicon, hydrogen and the hydrocarbyl groups;
   B. bonded to from one to three aminoaralkyl groups represented by the formula:

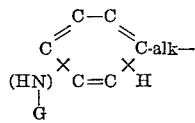

wherein alk is an aliphatic group containing at least two carbon atoms in the carbon chain linking each

group and said silicon atom, G is a member selected from the group consisting of the hydrocarbyl groups and the hydrogen atom, there are from one to three of the

groups and from 2 to 4 of the H— atoms bonded to carbon atoms of the

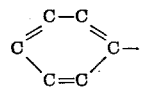

ring and the total number of said

groups and H— atoms that are bonded to said ring being five;
   C. bonded by each of any remaining valences to a member selected from the group consisting of hydrogen and the hydrocarbyl groups and (2) a polyepoxide containing at least two epoxy groups, each epoxy group being composed of an oxirane oxygen atom attached to vicinal carbon atoms.
2. The polymer of claim 1 wherein the aminoaralkyl group is an aminophenylethyl group.
3. The polymer of claim 1 wherein the amino-organosilicon compound is a silane.
4. The polymer of matter of claim 1 wherein said amino-organosilicon compound is a cyclic difunctional siloxane.
5. A curable composition comprising the amino-organosilicon compound and the polyepoxide defined in claim 1.
6. A polymer comprising the reaction product of (1) an amino-organosilicon compound having at least one silicon atom that is:
   A. bonded to from one to three oxygen atoms, each oxygen atom being bonded to a silicon atom;
   B. bonded to from one to three aminoaralkyl groups represented by the formula:

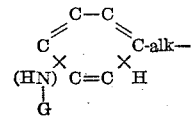

wherein alk is an aliphatic group containing at least two carbon atoms in the carbon chain linking each

group and said silicon atom, G is a hydrogen atom, there are from one to three of the

groups and from 2 to 4 of the H— atoms bonded to carbon atoms of the

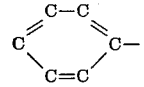

ring and the total number of said

groups and H— atoms that are bonded to said ring being five; and
   C. bonded by each of any remaining valences to a hydrocarbyl group and (2) a polyepoxide containing at least two epoxy groups, each epoxy group being composed of an oxirane oxygen atom attached to vicinal carbon atoms.
7. A polymer comprising the reaction product of (1) an amino-organosilicon compound having only one silicon atom that is:
   A. bonded to from one to three oxygen atoms, each oxygen atom being bonded to a hydrocarbyl group;
   B. bonded to from one to three aminoaralkyl groups represented by the formula:

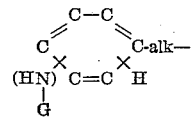

wherein alk is an aliphatic group containing at least two carbon atoms in the carbon chain linking each

group and said silicon atom, G is a hydrogen atom, there are from one to three of the

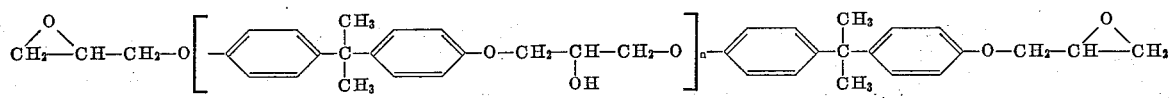

groups and from 2 to 4 of the H— atoms bonded to carbon atoms of the

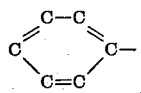

ring and the total number of said

groups and H— atoms that are bonded to said ring being five; and

C. bonded by each of any remaining valences to a hydrocarbyl group and (2) a polyepoxide containing at least two epoxy groups, each epoxy group being composed of an oxirane oxygen atom attached to vicinal carbon atoms.

8. A polymer comprising the reaction product of (1) the siloxane polymer consisting essentially of the groups:

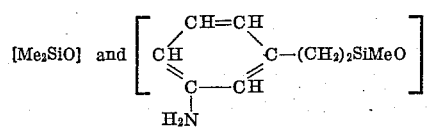

and (2) a diglycidyl ether of bisphenol A, said diglycidyl ether of bisphenol A having the formula:

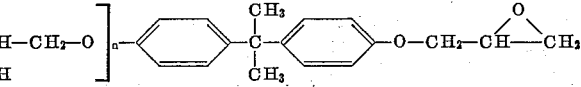

where $n$ is an integer having an average value of 0.1 to 0.2 in the proportions of 0.2 to 2 amino hydrogen equivalents for each epoxy equivalent.

References Cited by the Examiner

UNITED STATES PATENTS

| | | | |
|---|---|---|---|
| 2,754,284 | 7/1956 | Speck | 260—46.5 |
| 2,819,245 | 1/1958 | Shorr | 260—824 |
| 2,843,560 | 7/1958 | Mika | 260—824 |
| 2,949,434 | 8/1960 | Bailey et al. | 260—826 |
| 2,998,406 | 8/1961 | Bailey et al. | 260—448.2 |
| 3,033,815 | 5/1962 | Pike et al. | 260—448.2 |

FOREIGN PATENTS 202,627   7/1956   Australia.

MURRAY TILLMAN, *Primary Examiner.*
LEON J. BERCOVITZ, *Examiner.*